United States Patent
Park et al.

(10) Patent No.: US 7,593,468 B2
(45) Date of Patent: Sep. 22, 2009

(54) METHOD OF INTERFACING A HIGH SPEED SIGNAL

(75) Inventors: Jae-Jin Park, Sungnam-si (KR); Seung-Bin You, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 641 days.

(21) Appl. No.: 11/047,255

(22) Filed: Jan. 31, 2005

(65) Prior Publication Data

US 2005/0238125 A1  Oct. 27, 2005

(30) Foreign Application Priority Data

Feb. 2, 2004  (KR)  ............ 10-2004-0006624

(51) Int. Cl.
*H04B 14/04* (2006.01)

(52) U.S. Cl. .................................... 375/242

(58) Field of Classification Search ........... 375/242, 375/268, 269, 300, 320, 353; 348/471; 359/264; 370/533

See application file for complete search history.

(56) References Cited

U.S. PATENT DOCUMENTS

| 6,584,159 | B1 | 6/2003 | Azadet et al. | 375/285 |
| 6,643,471 | B2* | 11/2003 | Gurusami et al. | 398/189 |
| 2001/0037160 | A1 | 11/2001 | Kumata | 700/94 |
| 2002/0075968 | A1 | 6/2002 | Zerbe et al. | 375/286 |
| 2002/0196747 | A1 | 12/2002 | Agazzi | 370/286 |
| 2003/0011854 | A1* | 1/2003 | Kahn et al. | 359/173 |
| 2003/0039229 | A1* | 2/2003 | Ostman | 370/335 |
| 2004/0008794 | A1* | 1/2004 | McClellan | 375/260 |

FOREIGN PATENT DOCUMENTS

JP   2001-291834   10/2001

* cited by examiner

*Primary Examiner*—Sam K Ahn
(74) *Attorney, Agent, or Firm*—Mills & Onello, LLP.

(57) ABSTRACT

In a method of interfacing a high-speed signal, a series of digital signals are received from a transmitter in response to a clock signal. The received digital signal is coded based on a K-L level pulse amplitude modulation system in response to the clock signal, wherein K and L are natural numbers and K≠L. The received digital signal is repeatedly coded and the coded digital signal is transferred to a receiver. As a result, crosstalk between adjacent channels may be reduced.

11 Claims, 14 Drawing Sheets

METHOD OF INTERFACING A HIGH SPEED SIGNAL

CLAIM FOR PRIORITY

This application claims priority under 35 USC § 119 to Korean Patent Application No. 2004-6624, filed on Feb. 2, 2004, the contents of which are herein incorporated by reference in their entirety for all purposes.

BACKGROUND OF THE INVENTION

1. Field of the Invention

The present invention relates to a method of interfacing a high-speed signal, and more particularly to a method of interfacing a high-speed signal, capable of reducing crosstalk between adjacent channels.

2. Description of the Related Art

An electric signaling system has a transmitter, channels (or interconnects) and a receiver. Generally, a channel is composed of copper, and a signaling interface receives and transmits digital signals. The signaling system may be, for example, applied to computer-to-peripheral connections, local area networks, memory buses, multiprocessor interconnection networks, etc. As operating speed level and circuit integration level of semiconductor chips increase, a required bandwidth for off-chip data also increases so as to permit transmission and reception of data at high frequency. Therefore, there are design issues of the signaling interface such as high-speed operation, immunity to noise, clock generation/timing recovery, inter-symbol interference, and crosstalk, etc.

Crosstalk is a phenomenon in which a signal transmitted through one of multiple channels causes undesired noise to a neighboring channel.

FIGS. 1A through 1E are waveform graphs illustrating crosstalk that occurs between two adjacent channels.

FIG. 1A shows a pulse signal V1 that is applied to a first channel. FIG. 1B shows a noise signal V2S that occurs at a near end of a second channel due to the pulse signal V1 of the first channel, when there exists only a capacitive coupling between the first and second channels. FIG. 1C shows a noise signal V2E that occurs at a, far end of the second channel due to the pulse signal V1 of the first channel, when there exists only a capacitive coupling between the first and second channels.

In addition, FIG. 1D shows a noise signal V2S that occurs at a near end of the second channel due to the pulse signal V1 of the first channel, when there exists only an inductive coupling between the first and second channels. FIG. 1E shows a noise signal V2E that occurs at a far end of the second channel due to the pulse signal V1 of the first channel, when there exists only an inductive coupling between the first and second channels. As shown in FIGS. 1A through 1E, when a signal of a channel transitions, noise occurs at a neighboring channel.

FIG. 2 is a schematic diagram illustrating an exemplary four-level pulse amplitude modulation (PAM) system where two-bit binary values are assigned to voltage levels using a gray code, and FIG. 3 is a schematic diagram illustrating an exemplary eight-level PAM system where three binary values are assigned to voltage levels using a gray code.

When pulse amplitude modulation (PAM) is used to transfer data, transfer speed may increase. For example, six channels are required to transfer six-bit data without the PAM, while a 4-PAM transfers the six-bit data using three channels and an 8-PAM transfers the six-bit data using two channels. This is because two-bit data may be transferred via one channel using the 4-PAM and three-bit data may be transferred via one channel using the 8-PAM.

Referring to FIGS. 2 and 3, when a voltage level difference between adjacent data bits is represented by Δ, a maximum voltage level difference in data transition results in 3Δ in the 4-PAM, and 7Δ in the 8-PAM. However, when the voltage level difference in data transition is 7Δ, crosstalk between adjacent channels becomes serious.

Therefore, although the transfer rate may be increased in the 8-PAM, it is disadvantageous in that serious crosstalk may occur in the 8-PAM.

A method of canceling the crosstalk is adding a compensation signal to an interfered interconnect. However, the method is sensitive to process, temperature and interconnect parameter variation, etc.

Another method of canceling the crosstalk is providing a pair of interfering interconnects that are nearest neighbor interconnects of the interfered interconnect. A signal of one of the pair of interfering interconnects is symmetric to that of the other of the pair of interfering interconnects. The method is robust to the variations in process, temperature and interconnect parameters, etc. However, the method needs to employ dummy interconnects, and the transfer rate may be greatly decreased.

SUMMARY OF THE INVENTION

An exemplary embodiment of the present provides a method of interfacing a high speed signal. In the method, a series of digital signals are received from a transmitter in response to a clock signal. The received digital signals are coded based on a K-L level pulse amplitude modulation (PAM) system in response to the clock signal, wherein K and L are natural numbers and K≠L. The coding of the received digital signals is repeated to transfer the coded digital signals to a receiver.

In one embodiment, the coding of the received digital signals includes: coding an N-th digital signal among the series of digital signals based on a K-level PAM in response to the clock signal, wherein N is an integer; and coding an N+1-th digital signal among the series of digital signals based on an L-level PAM in response to the clock signal. K may be 8 and L may be 4.

In accordance with another aspect, the invention is directed to a method of interfacing a high speed signal. In the method, a series of digital signals are received from a transmitter in response to a clock signal. The received digital signals are coded based on a K-L level pulse amplitude modulation (PAM) system in response to the clock signal, wherein K and L are natural numbers and K≠L. The digital signal is encoded based on a lookahead scheme. The coding and the encoding of the digital signals are sequentially repeated to transfer the encoded digital signals to a receiver. The encoded digital signals are decoded and a final decoded digital signal is outputted.

The coding of the encoded digital signals includes: coding an N-th digital signal among the series of digital signals based on a K-level PAM in response to the clock signal, wherein N is an integer; and coding an N+1-th digital signal among the series of digital signals based on an L-level PAM in response to the clock signal. The encoding of the digital signals can include looking at data at a current clock cycle and next two data at following two clock cycles in advance to encode at least one of the next two data.

According to another aspect, the invention is directed to a method of interfacing a high speed signal. In the method, a series of digital signals are received from a transmitter in response to a clock signal. The received digital signals are coded based on an 8-4-level pulse amplitude modulation (PAM) system in response to the clock signal. The digital signals are encoded based on a lookahead scheme. The coding and the encoding of the digital signals are repeated to transfer the encoded digital signals to a receiver. The encoded digital signals are decoded and a final decoded digital signal is outputted.

In one embodiment, the coding of the encoded digital signal includes: coding an N-th digital signal among the series of digital signals based on a 8-level PAM in response to the clock signal, wherein N is an integer; and coding an N+1-th digital signal among the series of digital signals based on a 4-level PAM in response to the clock signal.

In one embodiment, when levels in the 8-level PAM are set to 0, 1, 2, 3, 4, 5, 6 and 7, levels in a 4-level PAM are set to 2, 3, 4 and 5. Also, encoding of the digital signals is performed using the levels 0 and 7 as extra amplitude levels, or 1 and 6 are used as the extra amplitude levels. The encoding the digital signals can include looking at data at a current clock cycle and next two data at following two clock cycles in advance to encode at least one of the two next data.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE EXEMPLARY EMBODIMENTS

Figure 1A:
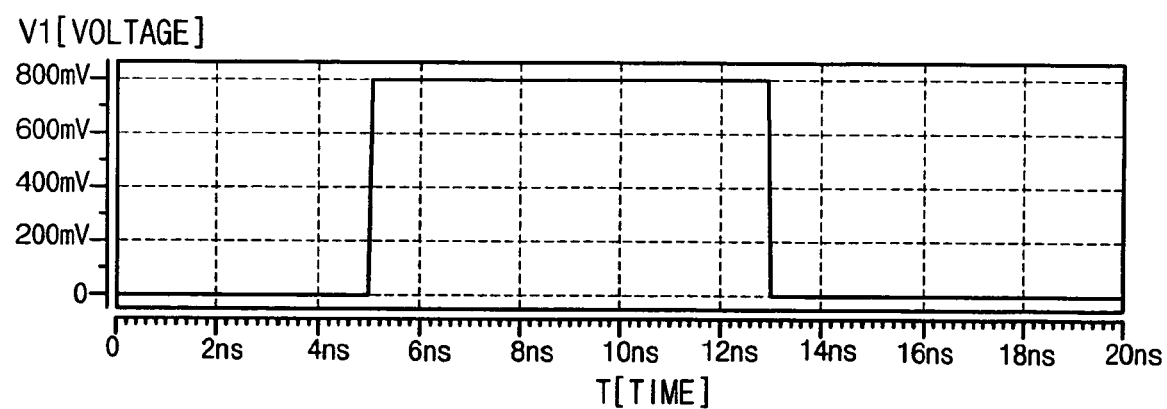
FIGS. 1A through 1E are exemplary waveforms illustrating crosstalk that occurs between two adjacent channels.
Figure 1B:
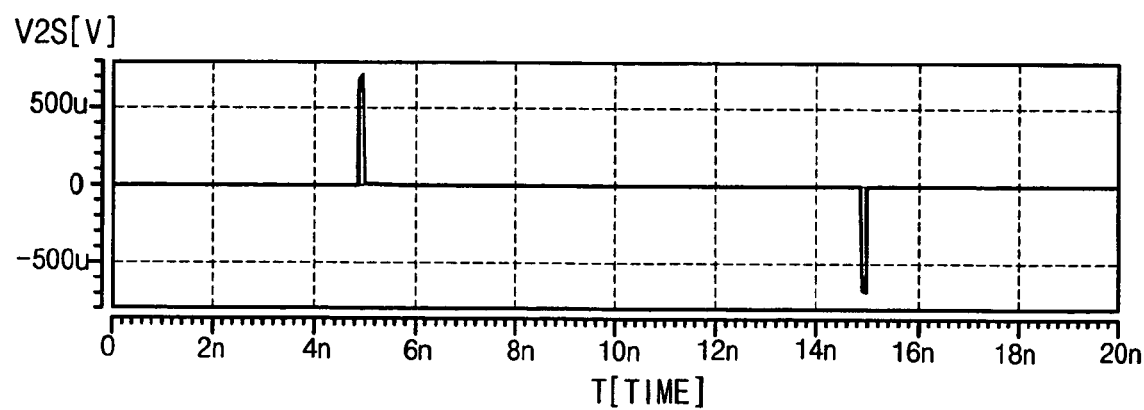
Figure 1C:
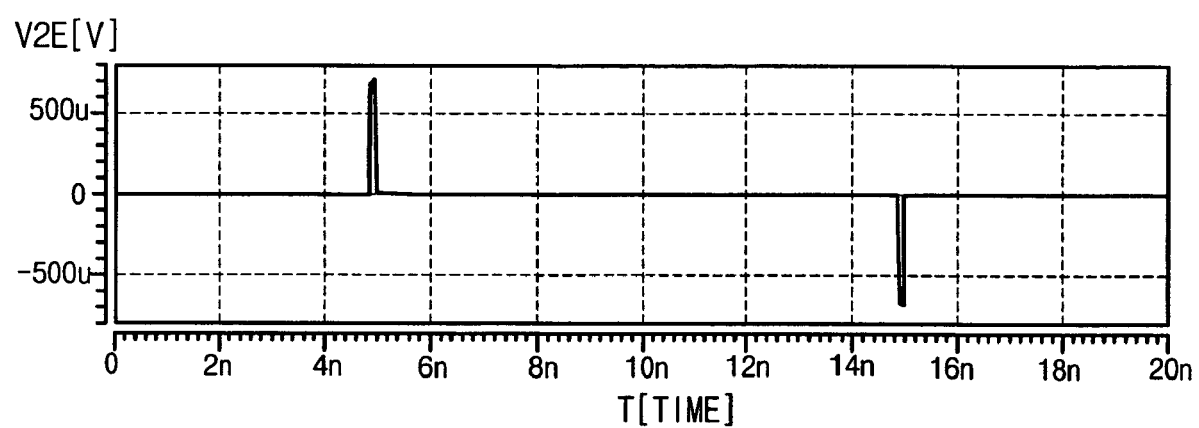
Figure 1D:
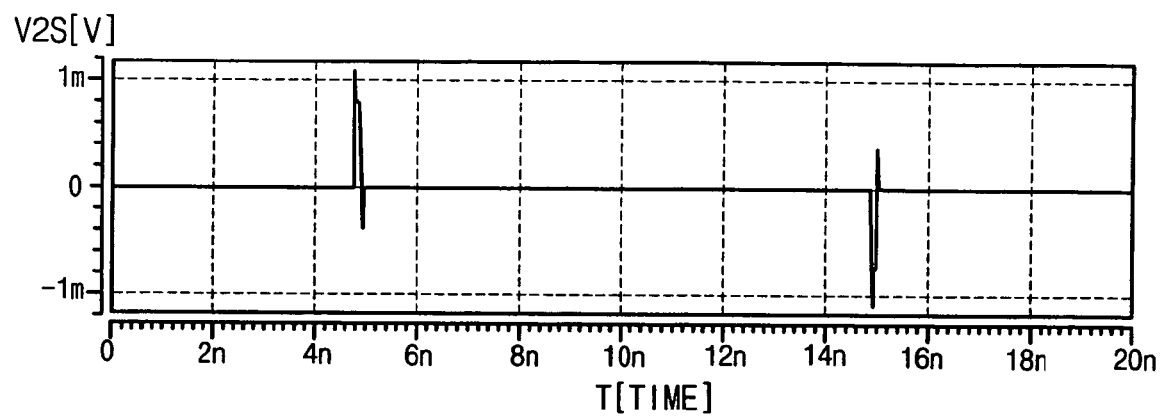
Figure 1E:
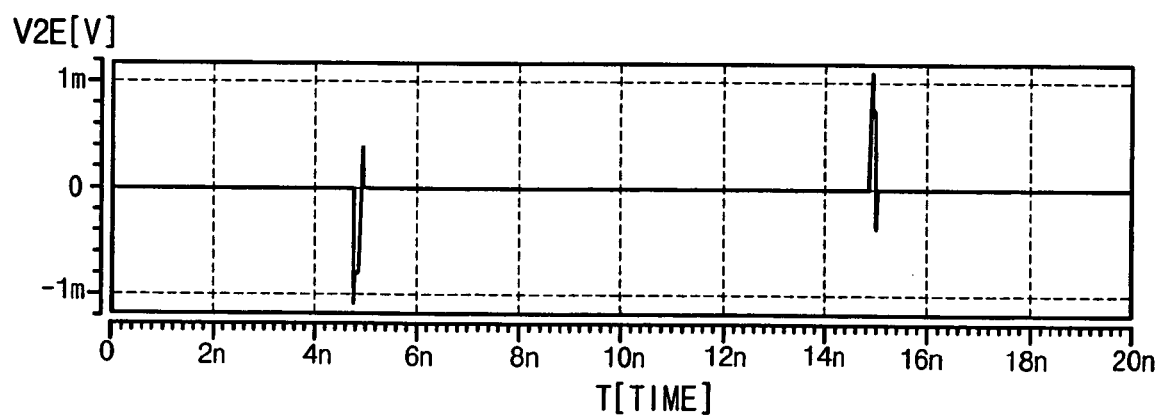
Figure 2:
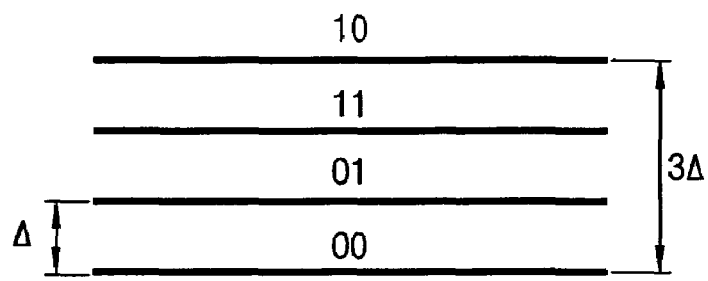
FIG. 2 is an exemplary schematic diagram illustrating a four-level PAM system where two-bit binary values are assigned to voltage levels using a gray code.
Figure 3:
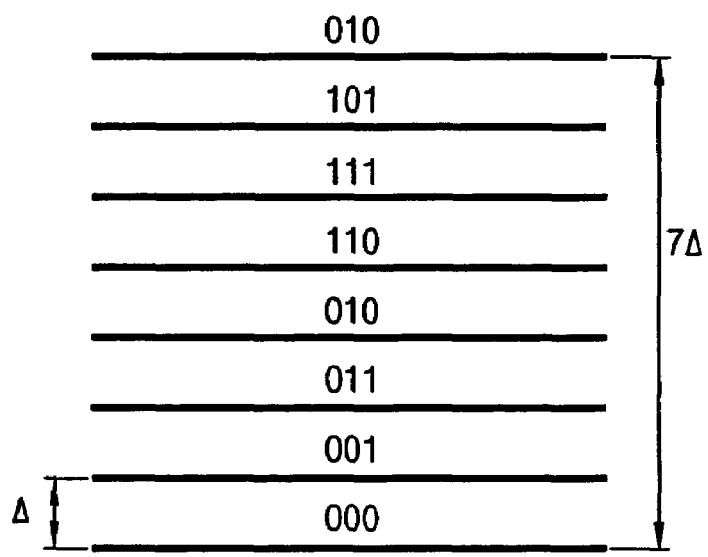
FIG. 3 is an exemplary schematic diagram illustrating an eight-level PAM system where three-bit binary values are assigned to voltage levels using a gray code.
Figure 4:
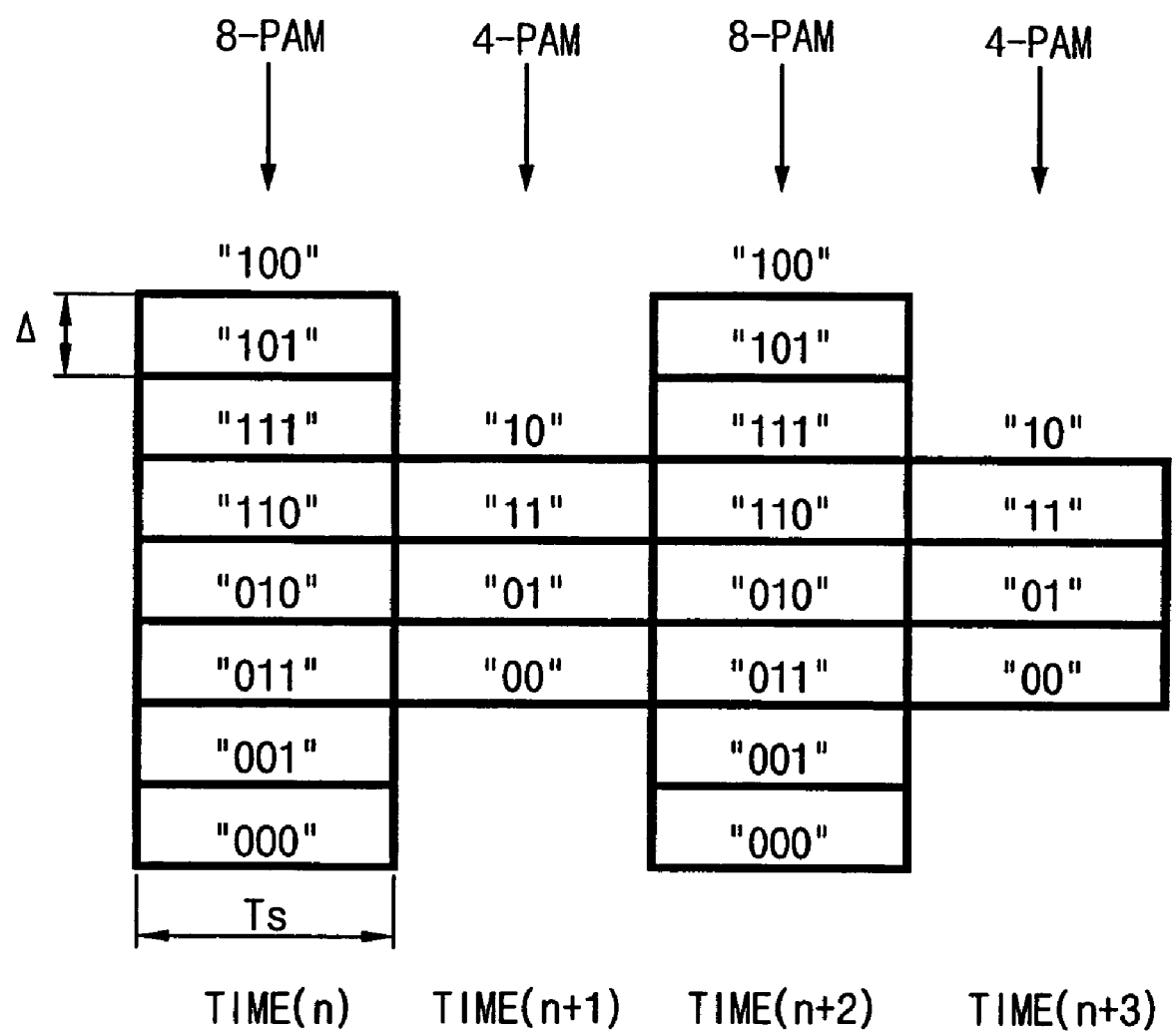
FIG. 4 is an exemplary schematic diagram illustrating an 8-4-level PAM system according to the present invention.

FIG. 4 is a schematic diagram illustrating an 8-4-level PAM system according to the present invention.

Referring to FIG. 4, the 8-4-level PAM system alternately uses an 8-level PAM system that assigns voltage levels to three-bit codes using a gray code and a 4-level PAM system that assigns voltage levels to two-bit codes using a gray code so as to transmit data. In FIG. 4, Ts represents a sampling period and TIME(n) through TIME(n+4) represent a clock cycle.

The 8-4-level PAM system converts input data to data coded according to a 8-level PAM during a time period of Time(n), converts to data coded according to a 4-level PAM during a time period of Time(n+1), converts to data coded according to the 8-level PAM during a time period of Time (n+2), and converts to data coded according to the 4-level PAM during a time period of Time(n+3). The input data is assigned to any one of binary values "000", "001", "011", "010", "110", "111", "101" and "100" by means of the 8-level PAM, and assigned to any one of binary values "00", "01", "10" and "11" by means of the 4-level PAM. The lowest voltage level '00' in the 4-level PAM corresponds to a third lowest voltage level '011' in the 8-level PAM, and the highest voltage level '10' in the 4-level PAM corresponds to a third highest voltage level '111' in the 8-level PAM.

Figure 5:
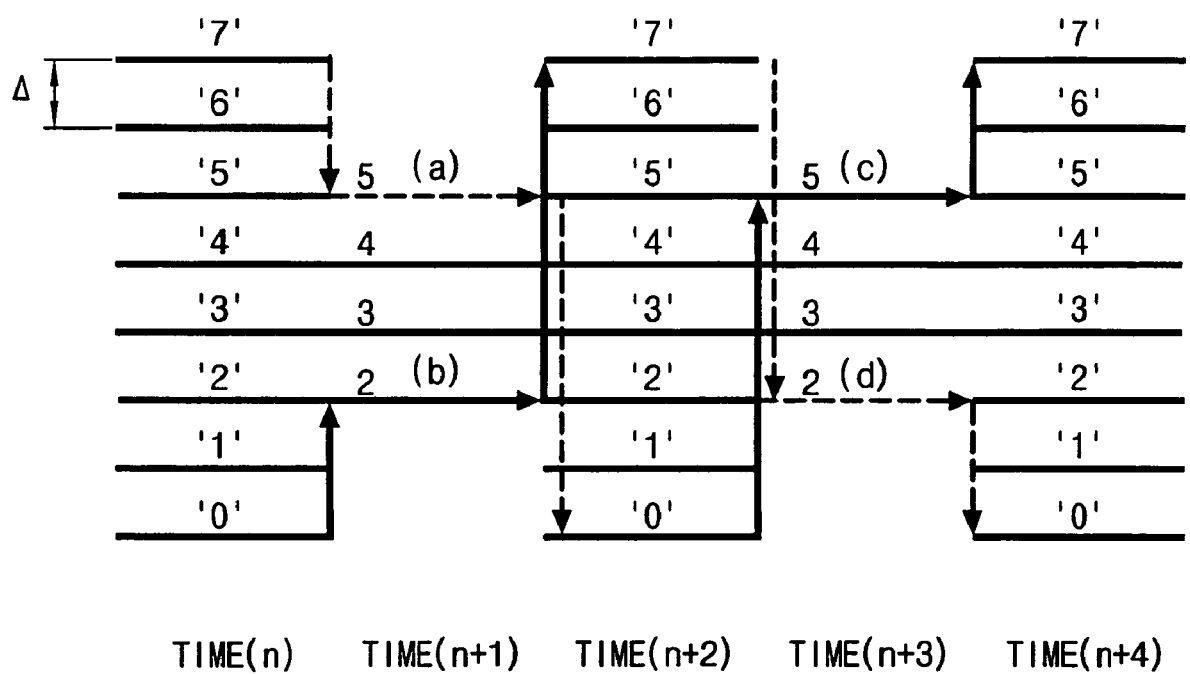
FIG. 5 is an exemplary schematic diagram illustrating data transition in the 8-4-level PAM of FIG. 4.

FIG. 5 is a schematic diagram illustrating data transition in the 8-4-level PAM of FIG. 4.

Referring to FIG. 5, the 8-4-level PAM system alternately uses an 8-level PAM and a 4-level PAM to transmit data in such cases as (a), (b), (c) and (d). For illustrative purposes, it is assumed that voltage levels in the 8-level PAM system are represented by 0, 1, 2, 3, 4, 5, 6 and 7, and voltage levels in the 4-level PAM system are represented by 2, 3, 4 and 5. In case of (a) in FIG. 5, data transit from level 7 to level 5, and then to level 0. In case of (b), data transit from level 0 to level 2, and then to level 7. In case of (c), data transit from level 0 to level 5, and then to level 7. In case of (d), data transit from level 7 to level 2, and then to level 0. A level difference in the above four data transitions (a), (b), (c) and (d) is all limited within 5Δ. When only the 8-level PAM is used to transmit data, the maximum magnitude of data transition results in 7Δ. Therefore, as shown in FIG. 5, crosstalk of neighboring channels may be reduced using the 8-4-level PAM system compared with the conventional 8-level PAM system.

Figure 6:
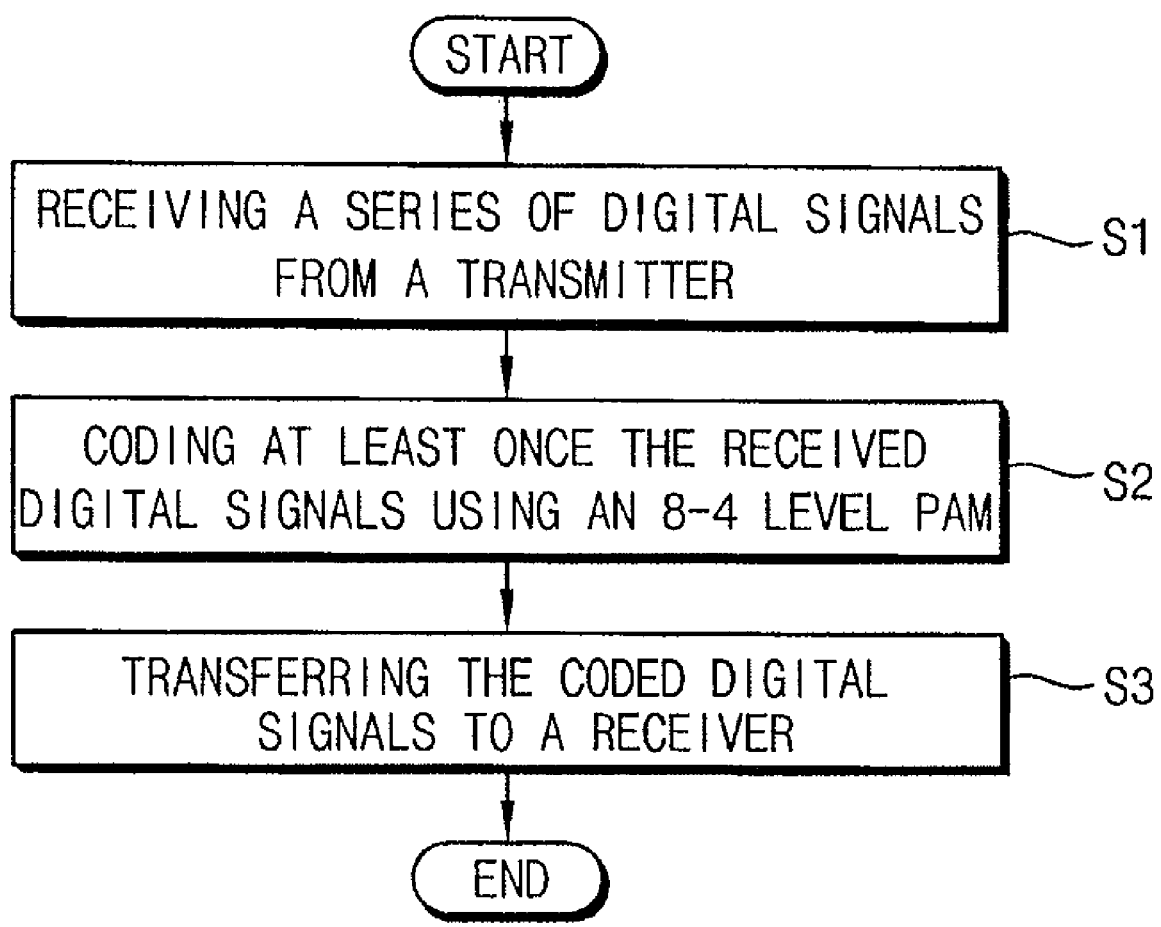
FIG. 6 is an exemplary flowchart diagram illustrating a method of transferring data using an 8-4-level PAM system according to the present invention.

FIG. 6 is a flowchart illustrating a method of transferring data using an 8-4-level PAM system according to the present invention.

Referring to FIG. 6, a series of digital signals are received from a transmitter in response to a clock signal (step S1). The received digital signal is coded into a gray code using an 8-4-level PAM system (step S2). The coded digital signal is then transferred to a receiver (step S3). The step S2 of coding the received digital signal includes coding an n-th (n being an integer) digital signal among the series of digital signals using an 8-level PAM in response to the clock signal and coding an n+1-th digital signal among the series of digital signals using a 4-level PAM in response to the clock signal.

Figure 7:
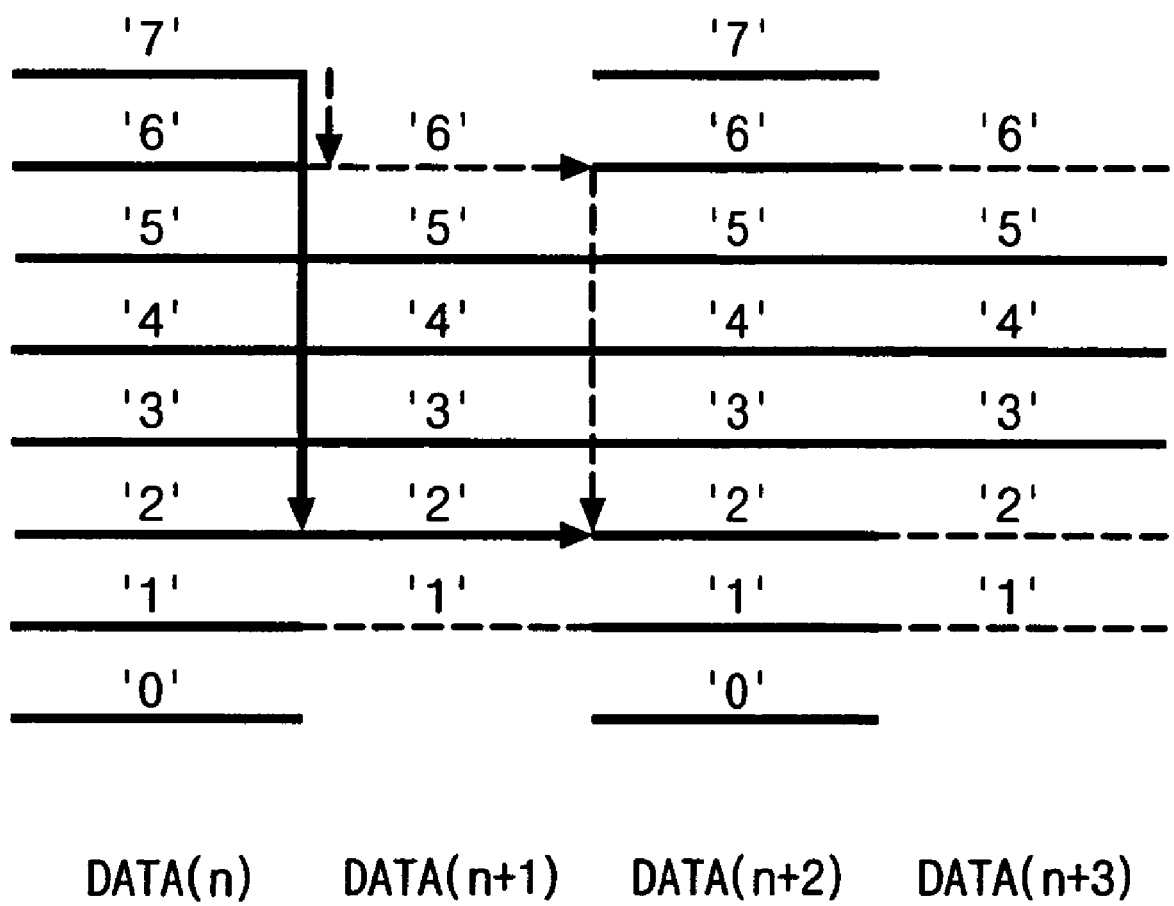
FIG. 7 is an exemplary schematic diagram illustrating data transition in an 8-4-level PAM that employs a lookahead scheme according to the present invention.

FIG. 7 is an exemplary schematic diagram illustrating data transition in an 8-4-level PAM that employs a lookahead scheme according to the present invention.

In a lookahead scheme, the next two data DATA(n+1) and DATA(n+2) at the following two clock cycles are checked during encoding procedure in advance as well as data DATA(n) at a current clock cycle, and an originally designated amplitude level of the data is changed to an extra amplitude level. Hence, the lookahead scheme may reduce the maximum magnitude of data transition.

For illustrative purposes, voltage levels in an 8-level PAM system are set to 0, 1, 2, 3, 4, 5, 6 and 7. In FIG. 7, voltage levels 1 and 6 are designated as extra amplitude levels.

Referring to FIG. 7, when DATA(n) is 7, DATA(n+1) is 2 and DATA(n+2) is 2, an amplitude level of the DATA(n+1) is reassigned from 2 to 6, and the magnitude of data transition is 4Δ. Thus, when an 8-4-level PAM system employing the lookahead scheme is used, the maximum magnitude of data transition is reduced to 4Δ. Conversely, when an 8-4-level PAM system that does not employ the lookahead scheme is used, a level difference between DATA(n) and DATA(n+1) is 5Δ.

Table 1 shows an exemplary encoding scheme of the 8-4-level PAM system that employs the lookahead scheme shown in FIG. 7.

TABLE 1

If DATA(n) = 7 & DATA(n + 1) = 2 & DATA(n + 2) > 1,
then DATA(n + 1) = 6
If DATA(n) > 1 & DATA(n + 1) = 2 & DATA(n + 2) = 7,
then DATA(n + 1) = 6
If DATA(n) = 0 & DATA(n + 1) = 5 & DATA(n + 2) < 6,
then DATA(n + 1) = 1
If DATA(n) < 6 & DATA(n + 1) = 5 & DATA(n + 2) = 0,
then DATA(n + 1) = 1

Figure 8:
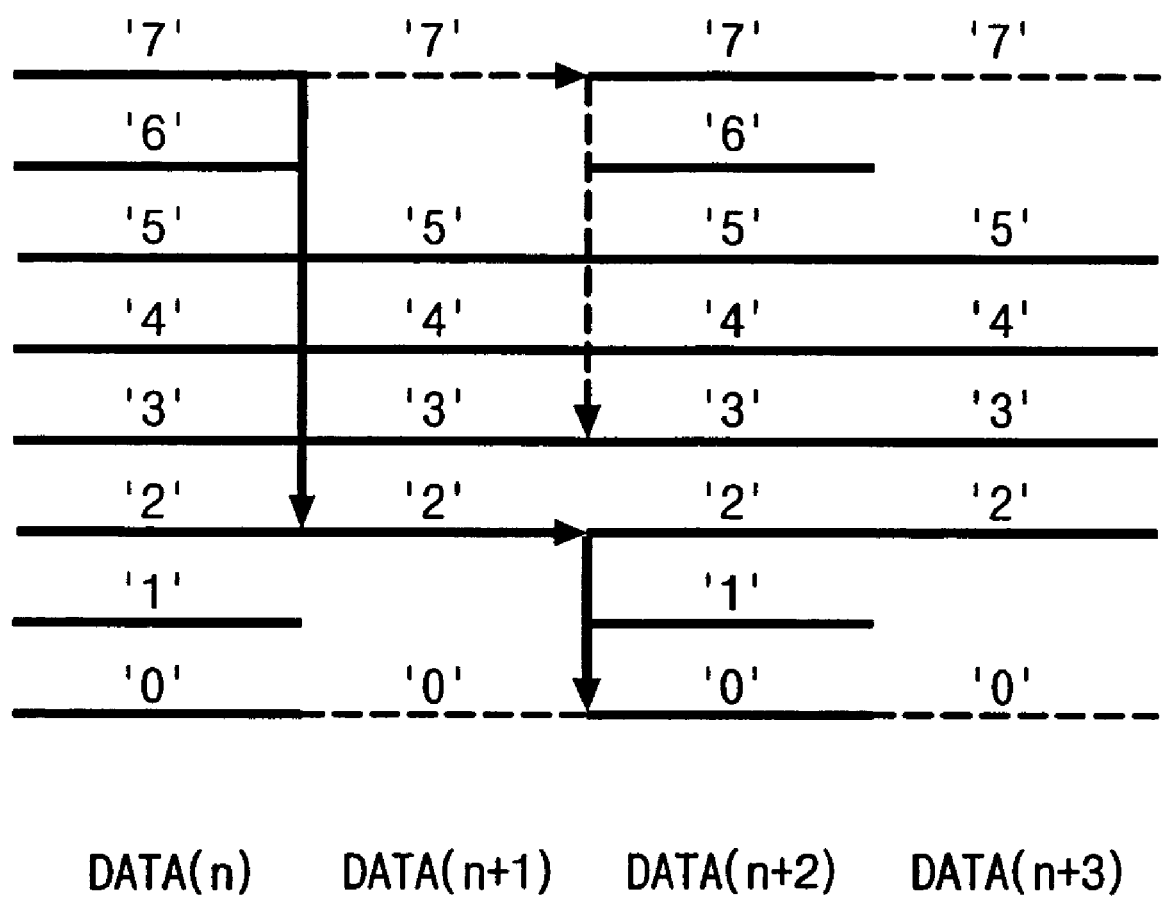
FIG. 8 is another exemplary schematic diagram illustrating data transition in an 8-4-level PAM that employs a lookahead scheme according to the present invention.

FIG. 8 is another exemplary schematic diagram illustrating data transition in an 8-4-level PAM that employs a lookahead scheme according to the present invention.

In FIG. 8, voltage levels 0 and 7 are designated as extra amplitude levels. Referring to FIG. 8, when DATA(n) is 7, DATA(n+1) is 2 and DATA(n+2) is 0, an amplitude level of the DATA(n+1) is reassigned from 2 to 7. Additionally, DATA(n+2) is also encoded to a new value, 3. Therefore, similarly to FIG. 7, the maximum data transition results in 4Δ since DATA(n) is 7, DATA(n+1) is 7 and DATA(n+2) is 3.

Table 2 shows an exemplary encoding algorithm of the 8-4-level PAM system that employs the lookahead scheme shown in FIG. 8.

TABLE 2

If DATA(n) = 7 & DATA(n + 1) = 2 & DATA(n + 2) = 1,
then DATA(n + 1) = 7 & DATA(n + 2) = 4
If DATA(n) = 7 & DATA(n + 1) = 2 & DATA(n + 2) = 0,
then DATA(n + 1) = 7 & DATA(n + 2) = 3
If DATA(n) > 5 & DATA(n + 1) = 5 & DATA(n + 2) = 0,
then DATA(n + 1) = 7 & DATA(n + 2) = 5
If DATA(n) = 0 & DATA(n + 1) = 5 & DATA(n + 2) = 6,
then DATA(n + 1) = 0 & DATA(n + 2) = 3
If DATA(n) = 0 & DATA(n + 1) = 5 & DATA(n + 2) = 7,
then DATA(n + 1) = 0 & DATA(n + 2) = 4
If DATA(n) < 2 & DATA(n + 1) = 2 & DATA(n + 2) = 7,
then DATA(n + 1) = 0 & DATA(n + 2) = 2

When the data encoded based on the encoding algorithms of tables 1 and 2 are transmitted via a channel(s), a receiver decodes the received data. Table 3 shows an exemplary decoding algorithm for the receiver.

TABLE 3

If IN(2n) = 7
   If IN(2n + 1) = 4, then DATA(2n) = 2 & DATA(2n + 1) = 1
   elseif IN(2n + 1) = 3, then DATA(2n) = 2 & DATA(2n + 1) = 0
   elseif IN(2n + 1) = 5, then DATA(2n) = 5 & DATA(2n + 1) = 0
   end
Elseif IN(2n) = 6, then DATA(2n) = 2
Elseif IN(2n) = 0
   If IN(2n + 1) = 4, then DATA(2n) = 5 & DATA(2n + 1) = 7
   elseif IN(2n + 1) = 3, then DATA(2n) = 5 & DATA(2n + 1) = 6
   elseif IN(2n + 1) = 2, then DATA(2n) = 2 & DATA(2n + 1) = 7
   end
Elseif IN(2n) = 1, then DATA(2n) = 5
Else
   No processing
End IN(x) in table 3 represents an input of the receiver, and DATA(x) represents a final decoded output of the receiver.

Figure 9:
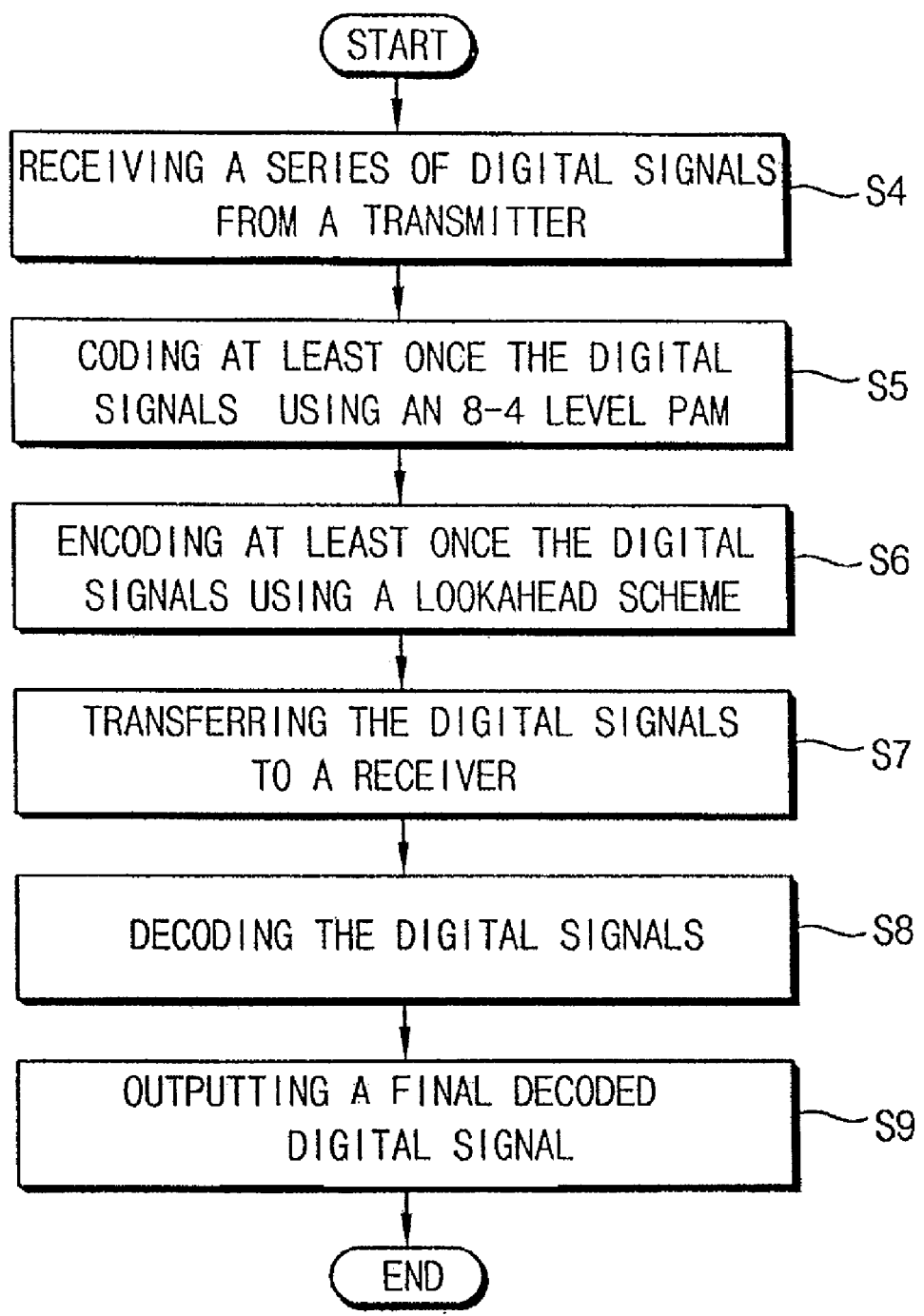
FIG. 9 is an exemplary flowchart diagram illustrating a method of receiving/transmitting data using an 8-4-level PAM system that employs a lookahead scheme.

FIG. 9 is a flowchart diagram illustrating a method of receiving/transmitting data using an 8-4-level PAM system that employs a lookahead scheme.

Referring to FIG. 9, a series of digital signals are received from a transmitter in response to a clock signal (step S4). The received digital signal is coded into a gray code using 8-4-level PAM system (step S5). The digital signal is encoded using the lookahead scheme (step S6). After the step S5 and step S6 are sequentially repeated, the digital signal is transferred to a receiver (step S7). The digital signal is then decoded in the receiver (step S8). A final decoded digital signal is outputted (step S9). The step S5 of coding the received digital signal may include coding an n-th (n being an integer) digital signal of the series of digital signals using an 8-level PAM in response to the clock signal and coding an n+1-th digital signal of the series of digital signals using a 4-level PAM in response to the clock signal. The step S6 of encoding the digital signal using the lookahead scheme may include looking at next two data DATA(n+1) and DATA(n+2) at following two clock cycles in advance as well as data DATA(n) at a current clock cycle and changing an originally designated amplitude level of data to an extra amplitude level so as to encode at least one of the next two data.

Figure 10:
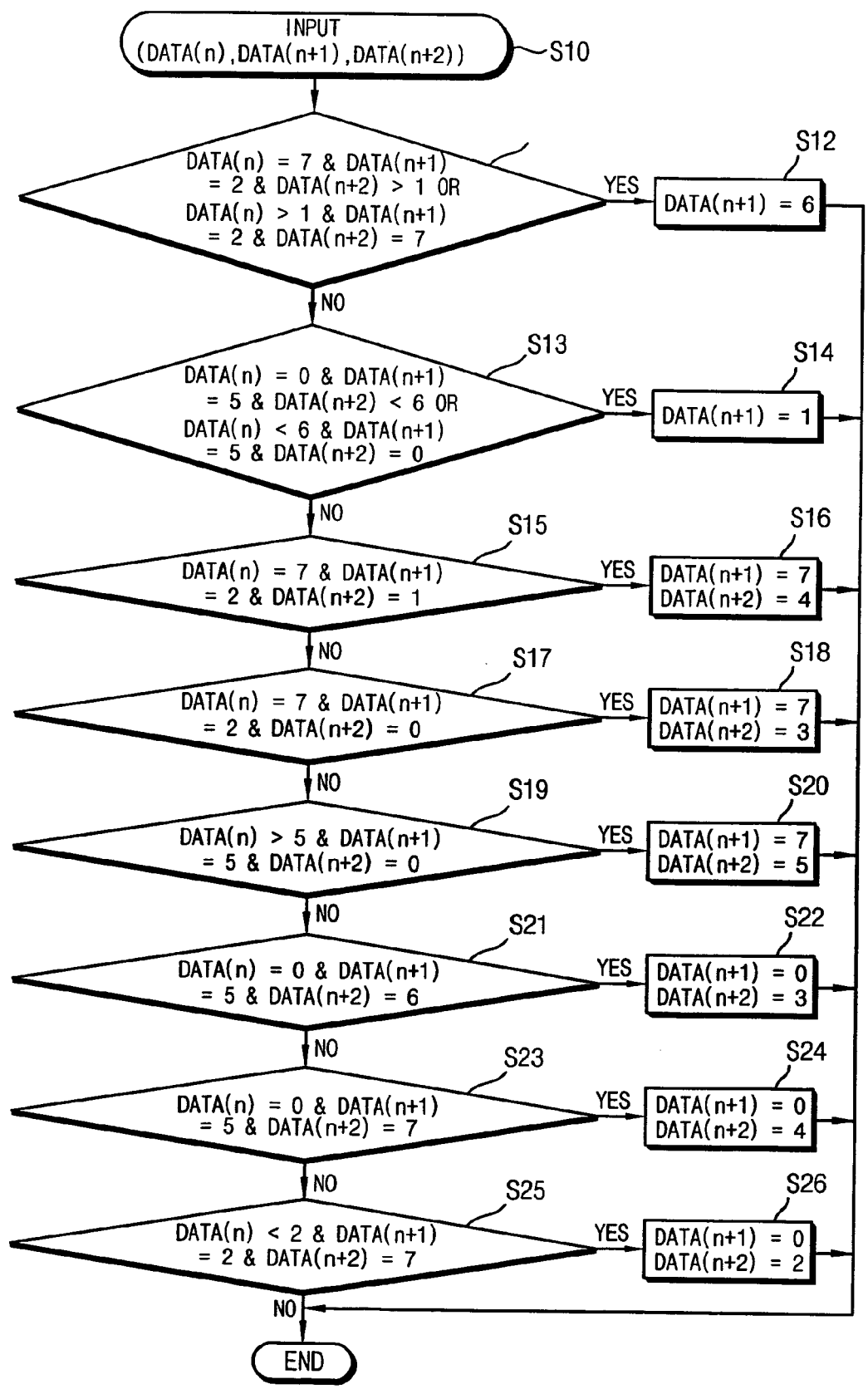
FIG. 10 is an exemplary flowchart diagram illustrating a method of encoding data using an 8-4-level PAM system that employs a lookahead scheme in FIGS. 7 and 8.

FIG. 10 is a flowchart diagram illustrating a method of encoding data using an 8-4-level PAM system that employs a lookahead scheme shown in FIGS. 7 and 8.

Referring to FIG. 10, DATA(n) at a current clock cycle and DATA(n+1), DATA(n+2) at following two clock cycles are received (step S10). It is determined whether DATA(n) is 7, DATA(n+1) is 2 and DATA(n+2) is greater than 1, or whether DATA(n) is greater than 1, DATA(n+1) is 2 and DATA(n+2) is 7 (step S11). When the result the step S11 is 'YES', DATA(n+1) is reassigned to 6 (step S12), and when the result of step S11 is 'NO', it is determined whether DATA(n) is 0, DATA(n+1) is 5 and DATA(n+2) is less than 6, or whether DATA(n) is less than 6, DATA(n+1) is 5 and DATA(n+2) is 0 (step S13).

When the result of step S13 is 'YES', DATA(n+1) is reassigned to 1 (step S14), and when the result of step S13 is 'NO', it is determined whether DATA(n) is 7, DATA(n+1) is 2 and DATA(n+2) is 1 (step S15). When the result of step S15 is 'YES', DATA(n+1) is reassigned to 7 and DATA(n+2) is reassigned to 4 (step S16). When the result of step S15 is 'NO', it is determined whether DATA(n) is 7, DATA(n+1) is 2 and DATA(n+2) is 0 (step S17).

When the result of step S17 is 'YES', DATA(n+1) is reassigned to 7 and DATA(n+2) is reassigned to 3 (step S18), and when the result of step S17 is 'NO', it is determined whether DATA(n) is greater than 5, DATA(n+1) is 5 and DATA(n+2) is 0 (step S19). When the result of step S19 is 'YES', DATA(n+1) is reassigned to 7 and DATA(n+2) is reassigned to 5 (step S20), and when the result of step S19 is 'NO', it is determined whether DATA(n) is 0, DATA(n+1) is 5 and DATA(n+2) is 6 (step S21).

When the result of step S21 is 'YES', DATA(n+1) is reassigned to 0 and DATA(n+2) is reassigned to 3 (step S22), and when the result of step S21 is 'NO', it is determined whether DATA(n) is 0, DATA(n+1) is 5 and DATA(n+2) is 7 (step S23). When the result of step S23 is 'YES', DATA(n+1) is reassigned to 0 and DATA(n+2) is reassigned to 4 (step S24), and when the result of step S23 is 'NO', it is determined whether DATA(n) is less than 2, DATA(n+1) is 2 and DATA(n+2) is 7 (step S25). When the result of step S25 is 'YES', DATA(n+1) is reassigned to 0 and DATA(n+2) is reassigned to 2 (step S26).

Figure 11:
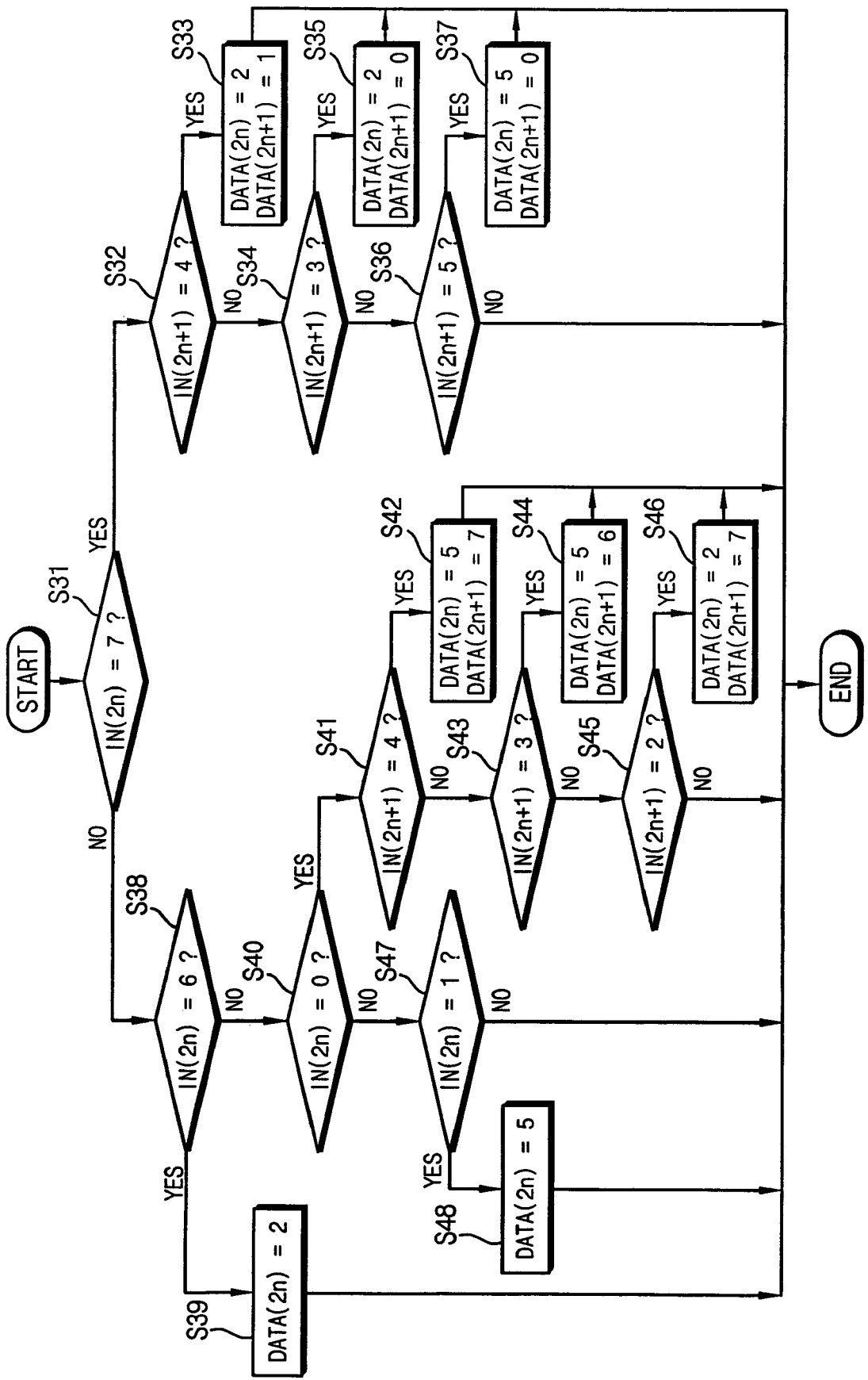
FIG. 11 is an exemplary flowchart diagram illustrating a method of decoding data that is encoded by a method of FIG. 10.

FIG. 11 is a flowchart diagram illustrating a method of decoding data that is encoded based on the method of FIG. 10.

Referring to FIG. 11, it is determined whether IN(2n) is 7 (step S31). When the result of step S31 is 'YES', it is determined whether IN(2n+1) is 4 (step S32). When the result of step S32 is 'YES', DATA(2n) is reassigned to 2 and DATA(2n+1) is reassigned to 1 (step S33), and when the result of step S32 is 'NO', it is determined whether IN(2n+1) is 3 (step S34). When the result of step S34 is 'YES', DATA(2n) is reassigned to 2 and DATA(2n+1) is reassigned to 0 (step S35), and when the result of step S34 is 'NO', it is determined whether IN(2n+1) is 5 (step S36). When the result of step S36 is 'YES', DATA(2n) is reassigned to 5 and DATA(2n+1) is reassigned to 0 (step S37).

When the result of step S31 is 'NO', it is determined whether IN(2n) is 6 (step S38). When the result of step S38 is 'YES', DATA(2n) is reassigned to 2 (step S39), and when the result of step S38 is 'NO', it is determined whether IN(2n) is 0 (step S40). When the result of step S40 is 'YES', it is determined whether IN(2n+1) is 4 (step S41). When the result of step S41 is 'YES', DATA(2n) is reassigned to 5 and DATA(2n+1) is reassigned to 7 (step S42), and when the result of step S41 is 'NO', it is determined whether IN(2n+1) is 3 (step S43). When the result of step S43 is 'YES', DATA(2n) is reassigned to 5 and DATA(2n+1) is reassigned to 6 (step S44), and when the result of step S41 is 'NO', it is determined whether IN(2n+1) is 2 (step S45). When the result of step S45 is 'YES', DATA(2n) is reassigned to 2 and DATA(2n+1) is reassigned to 7 (step S46). When the result of step S40 is 'NO', it is determined whether IN(2n) is 1 (step S47), and when the result of step S47 is 'YES', DATA(2n) is reassigned to 5 (step S48).

Figure 12A:
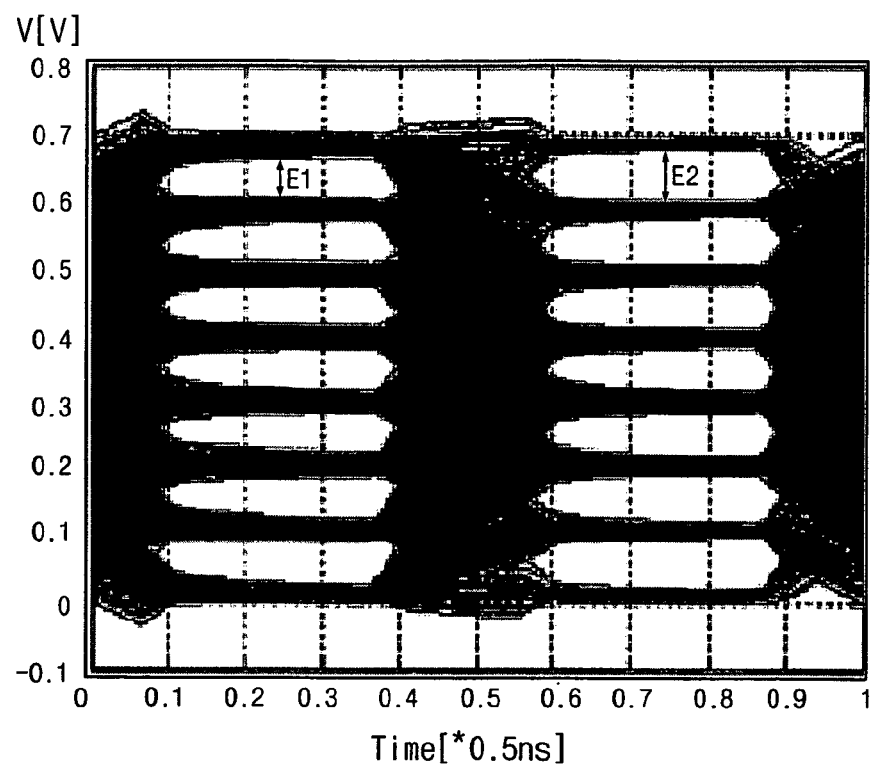
FIG. 12A is an exemplary simulated eye diagram for an 8-4-level PAM system that employs a lookahead scheme with a variable input voltage.
Figure 12B:
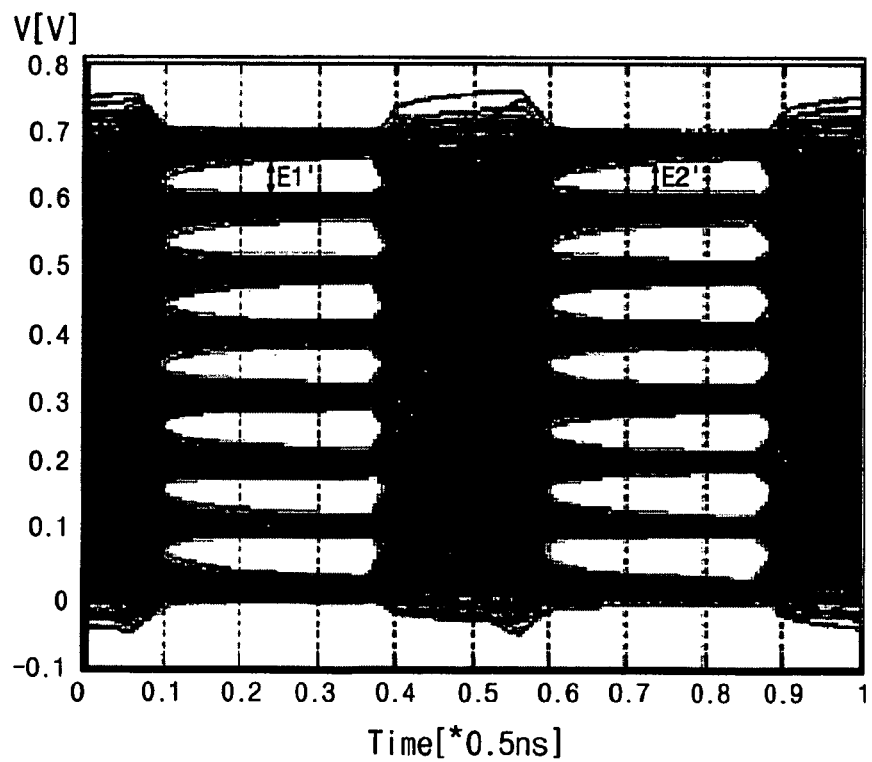
FIG. 12B is an exemplary simulated eye diagram for an 8-4-level PAM system that does not employ a lookahead scheme with a variable input voltage.

FIG. 12A is an exemplary simulated eye diagram for an 8-4-level PAM system that employs a lookahead scheme, and FIG. 12B is an exemplary simulated eye diagram for an 8-4-level PAM system that does not employ a lookahead scheme.

FIGS. 12A and 12B show simulation results for the 8-4-level PAM system while variable input voltage is applied to an interfering interconnect. With reference to FIGS. 12A and 12B, it can be seen that the eye sizes E1 and E2 in FIG. 12A is larger that the corresponding eye size E1' and E2' in FIG. 12B. This shows that the 8-4-level PAM system employing the lookahead scheme more effectively reduces the crosstalk than the 8-4-level PAM system without employing the lookahead scheme.

Figure 13A:
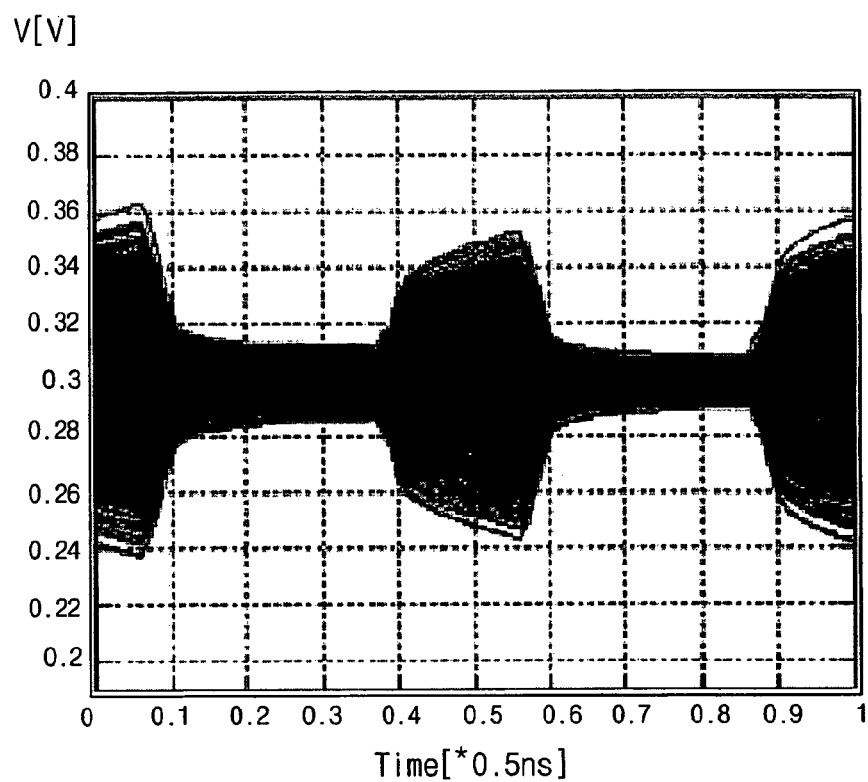
FIG. 13A is an exemplary simulated eye diagram for an 8-4-level PAM system that employs a lookahead scheme with a constant input voltage.
Figure 13B:
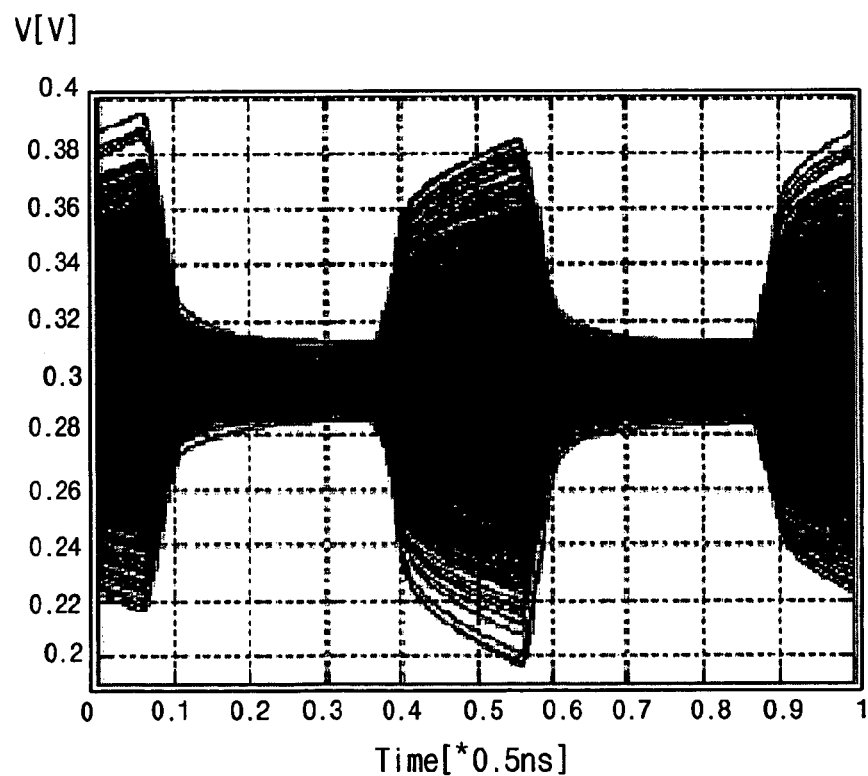
FIG. 13B is an exemplary simulated eye diagram for an 8-4-level PAM system that does not employ a lookahead scheme with a constant input voltage.

FIG. 13A is an exemplary simulated eye diagram for an 8-4-level PAM system that employs a lookahead scheme, and FIG. 13B is an exemplary simulated eye diagram for an 8-4-level PAM system that does not employ a lookahead scheme.

FIGS. 13A and 13B show simulation results for the 8-4-level PAM system while constant input voltage is applied to an interfering interconnect. With reference to FIGS. 13A and 13B, it can be seen that the 8-4-level PAM system employing the lookahead scheme more efficiently eliminates the crosstalk than the 8-4-level PAM system without employing the lookahead scheme.

Although the method of reducing the crosstalk between adjacent channels using the 8-4-level PAM system is described above, the method of reducing the crosstalk of the present invention may employ a K-L level PAM system (K, and L are natural numbers and K≠L), which alternately uses a K level PAM and an L level PAM.

According to the method of interfacing a high-speed signal of the present invention, the crosstalk between adjacent channels may be reduced. Additionally, the maximum magnitude of data transition of an interconnect signal, which generates crosstalk to neighboring interconnects, may decrease. Additionally, the method of interfacing a high-speed signal of the present invention is less sensitive to process, temperature and interconnect parameter variation, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of interfacing a high speed signal, comprising:
   receiving a series of digital signals from a transmitter in response to a clock signal;
   coding into a Gray code at least once the received digital signals based on a K-L level pulse amplitude modulation (PAM) system in response to the clock signal, wherein K and L are natural numbers and K≠L, and wherein the K-L level PAM system alternately uses a K-level PAM and an L-level PAM, wherein K is 8 and L is 4, and wherein the 4-level PAM has a lowest level corresponding to a third lowest level of the 8-level PAM, and a highest level corresponding to a third highest level of the 8-level PAM; and
   transferring the coded digital signals to a receiver, wherein coding the received digital signals includes:
      coding an N-th digital signal among the series of digital signals based on the K-level PAM in response to the clock signal, wherein N is an integer; and
      coding an N+1-th digital signal among the series of digital signals based on the L-level PAM in response to the clock signal.

2. The method of claim 1, wherein, when levels in the 8-level PAM are set to 0, 1, 2, 3, 4, 5, 6 and 7, levels in the 4-level PAM are set to 2, 3, 4 and 5.

3. A method of interfacing a high speed signal, comprising:
   receiving a series of digital signals from a transmitter in response to a clock signal;
   coding into a Gray code at least once the received digital signals based on a K-L level pulse amplitude modulation (PAM) system in response to the clock signal, wherein K and L are natural numbers and K≠L, and wherein the K-L level PAM system alternately uses a K-level PAM and an L-level PAM;
   encoding at least once the digital signals based on a lookahead scheme;

transferring the digital signals to a receiver after the digital signals are coded into the Gray code based on the K-L level PAM system and encoded based on the lookahead scheme;
decoding the digital signals; and
outputting a final decoded digital signal, wherein coding the received digital signals includes:
coding an N-th digital signal among the series of digital signals based on the K-level PAM in response to the clock signal, wherein N is an integer; and
coding an N+1-th digital signal among the series of digital signals based on the L-level PAM in response to the clock signal.

4. The method of claim 3, wherein the encoding of the digital signals includes looking at data at a current clock cycle and next two data at following two clock cycles in advance to encode at least one of the next two data.

5. A method of interfacing a high speed signal, comprising:
receiving a series of digital signals from a transmitter in response to a clock signal;
coding into a Gray code at least once the received digital signals based on a 8-4-level pulse amplitude modulation (PAM) system in response to the clock signal, wherein the 8-4 level PAM system alternately uses a 8-level PAM and a 4-level PAM;
encoding at least once the digital signals based on a lookahead scheme;
transferring the digital signals to a receiver after the digital signals are coded into the Gray code based on the 8-4-level PAM system and encoded based on the lookahead scheme;
decoding the digital signals; and
outputting a final decoded digital signal, wherein coding the received digital signals includes:
coding an N-th digital signal among the series of digital signals based on the 8-level PAM in response to the clock signal, wherein N is an integer; and
coding an N+1-th digital signal among the series of digital signals based on the 4-level PAM in response to the clock signal.

6. The method of claim 5, wherein the 4-level PAM has a lowest level corresponding to a third lowest level of the 8-level PAM, and a highest level corresponding to a third highest level of the 8-level PAM.

7. The method of claim 6, wherein, when levels in the 8-level PAM are set to 0, 1, 2, 3, 4, 5, 6 and 7, levels in a 4-level PAM are set to 2, 3, 4 and 5.

8. The method of claim 7, wherein the encoding of the digital signals is performed using the levels 0 and 7 as extra amplitude levels, or 1 and 6 as the extra amplitude levels.

9. The method of claim 5, wherein the encoding of the digital signals includes looking at data at a current clock cycle and next two data at following two clock cycles in advance to encode at least one of the two next data.

10. The method of claim 7, wherein the encoding of the digital signals includes:
(a) receiving DATA(n) at a current clock cycle and DATA(n+1), DATA(n+2) at following two clock cycles, wherein DATA(n) denotes the N-th digital signal among the series of digital signals, DATA(n+1) denotes the N+1-th digital signal among the series of digital signals, and DATA(n+2) denotes an N+2-th digital signal among the series of digital signals;
(b) determining if DATA(n) is 7, DATA(n+1) is 2 and DATA(n+2) is greater than 1 or if DATA(n) is greater than 1, DATA(n+1) is 2 and DATA(n+2) is 7;
(c) reassigning DATA(n+1) to 6, when the determination in step (b) is positive;
(d) determining if DATA(n) is 0, DATA(n+1) is 5 and DATA(n+2) is less than 6 or if DATA(n) is less than 6, DATA(n+1) is 2 and DATA(n+2) is 0, when the determination in step (b) is negative;
(e) reassigning DATA(n+1) to 1, when the determination in step (d) is positive;
(f) determining if DATA(n) is 7, DATA(n+1) is 2 and DATA(n+2) is 1, when the determination in step (d) is negative;
(g) reassigning DATA(n+1) to 7 and DATA(n+2) to 4, when the determination in step (f) is positive;
(h) determining if DATA(n) is 7, DATA(n+1) is 2 and DATA(n+2) is 0, when the determination in step (f) is negative;
(i) reassigning DATA(n+1) to 7 and DATA(n+2) to 3, when the determination in step (h) is positive;
(j) determining if DATA(n) is greater than 5, DATA(n+1) is 5 and DATA(n+2) is 0, when the determination in step (h) is negative;
(k) reassigning DATA(n+1) to 7 and DATA(n+2) to 5, when the determination in step (j) is positive;
(l) determining if DATA(n) is 0, DATA(n+1) is 5 and DATA(n+2) is 6, when the determination in step (j) is negative;
(m) reassigning DATA(n+1) to 0 and DATA(n+2) to 3, when the determination in step (l) is positive;
(n) determining if DATA(n) is 0, DATA(n+1) is 5 and DATA(n+2) is 7, when the determination in step (l) is negative;
(o) reassigning DATA(n+1) to 0 and DATA(n+2) to 4, when the determination in step (n) is positive;
(p) determining if DATA(n) is less than 2, DATA(n+1) is 2 and DATA(n+2) is 7, when the determination in step (n) is negative; and
(q) reassigning DATA(n+1) to 0 and DATA(n+2) to 2, when the determination in step (p) is positive.

11. The method of claim 7, wherein the decoding of the encoded digital signals includes:
(a) determining whether IN(2$n$) is 7, wherein IN(2$n$) denotes an N-th input digital signal of the receiver;
(b) determining whether IN(2$n$+1) is 4, when the determination in step (a) is positive, wherein IN(2$n$+1) denotes an N+1-th input digital signal of the receiver;
(c) reassigning DATA(2$n$) to 2 and DATA(2$n$+1) to 1, when the determination in step (b) is positive, wherein DATA(2$n$) denotes an N-th output digital signal of the receiver and DATA(2$n$+1) denotes an N+1-th output digital signal of the receiver;
(d) determining if IN(2$n$+1) is 3 if the determination in step (b) is negative;
(e) reassigning DATA(2$n$) to 2 and DATA(2$n$+1) to 0, when the determination in step (d) is positive;
(f) determining if IN(2$n$+1) is 5 when the determination in step (d) is negative;
(g) reassigning DATA(2$n$) to 5 and DATA(2$n$+1) to 0, when the determination in step (f) is positive;
(h) determining if IN(2$n$) is 6, when the determination in step (a) is negative;
(i) reassigning DATA(2$n$) to 2, when the determination in step (h) is positive;
(j) determining if IN(2$n$) is 0, when the determination in step (h) is negative;
(k) determining if IN(2$n$+1) is 4, when the determination in step (j) is positive;

(l) reassigning DATA($2n$) to 5 and DATA($2n+1$) to 7, when the determination in step (k) is positive;
(m) determining if IN($2n+1$) is 3, when the determination in step (k) is negative;
(n) reassigning DATA($2n$) to 5 and DATA($2n+1$) to 6, when the determination in step (m) is positive;
(o) determining if IN($2n+1$) is 2, when the determination in step (m) is negative;
(p) reassigning DATA($2n$) to 2 and DATA($2n+1$) to 7, when the determination in step (o) is positive;
(q) determining if IN($2n$) is 1, when the determination in step (j) is negative; and
(r) reassigning DATA($2n$) to 5, when the determination in step (q) is positive.

* * * * *

UNITED STATES PATENT AND TRADEMARK OFFICE
CERTIFICATE OF CORRECTION

PATENT NO. : 7,593,468 B2 Page 1 of 1
APPLICATION NO. : 11/047255
DATED : September 22, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Twenty-first Day of September, 2010

David J. Kappos
*Director of the United States Patent and Trademark Office*